United States Patent [19]

Eychaner

[11] Patent Number: 4,617,615

[45] Date of Patent: Oct. 14, 1986

[54] POOL LIGHT

[76] Inventor: James Eychaner, 68-030 Estio Rd., Cathedral City, Calif. 92234

[21] Appl. No.: 682,561

[22] Filed: Dec. 7, 1984

Related U.S. Application Data

[63] Continuation of Ser. No. 503,613, Jun. 13, 1983, abandoned.

[51] Int. Cl.[4] .................................................. F21S 5/00
[52] U.S. Cl. ...................................... 362/216; 362/267
[58] Field of Search ................ 362/216, 158, 186, 267

[56] References Cited

U.S. PATENT DOCUMENTS

| | | | |
|---|---|---|---|
| 3,513,585 | 5/1970 | Ross | 362/216 |
| 4,290,094 | 9/1981 | Jensen | 362/267 |
| 4,410,834 | 10/1983 | Witte | 362/216 |
| 4,420,799 | 12/1983 | Miller | 362/216 |
| 4,433,366 | 2/1984 | Wade | 362/267 |

*Primary Examiner*—Donald P. Walsh

[57] ABSTRACT

An improved pool light is disclosed, characterized by the use of a circular fluorescent light bulb mounted in a fixture that can be retrofitted into or be utilized as an alternative to an existing conventional incandescent pool light. The fixture includes retaining clips on one side to hold the fluorescent bulb in position and is formed to cooperate with and be disposed within the existing rubber seal of the lens to maintain the waterproof seal of the lens.

6 Claims, 4 Drawing Figures

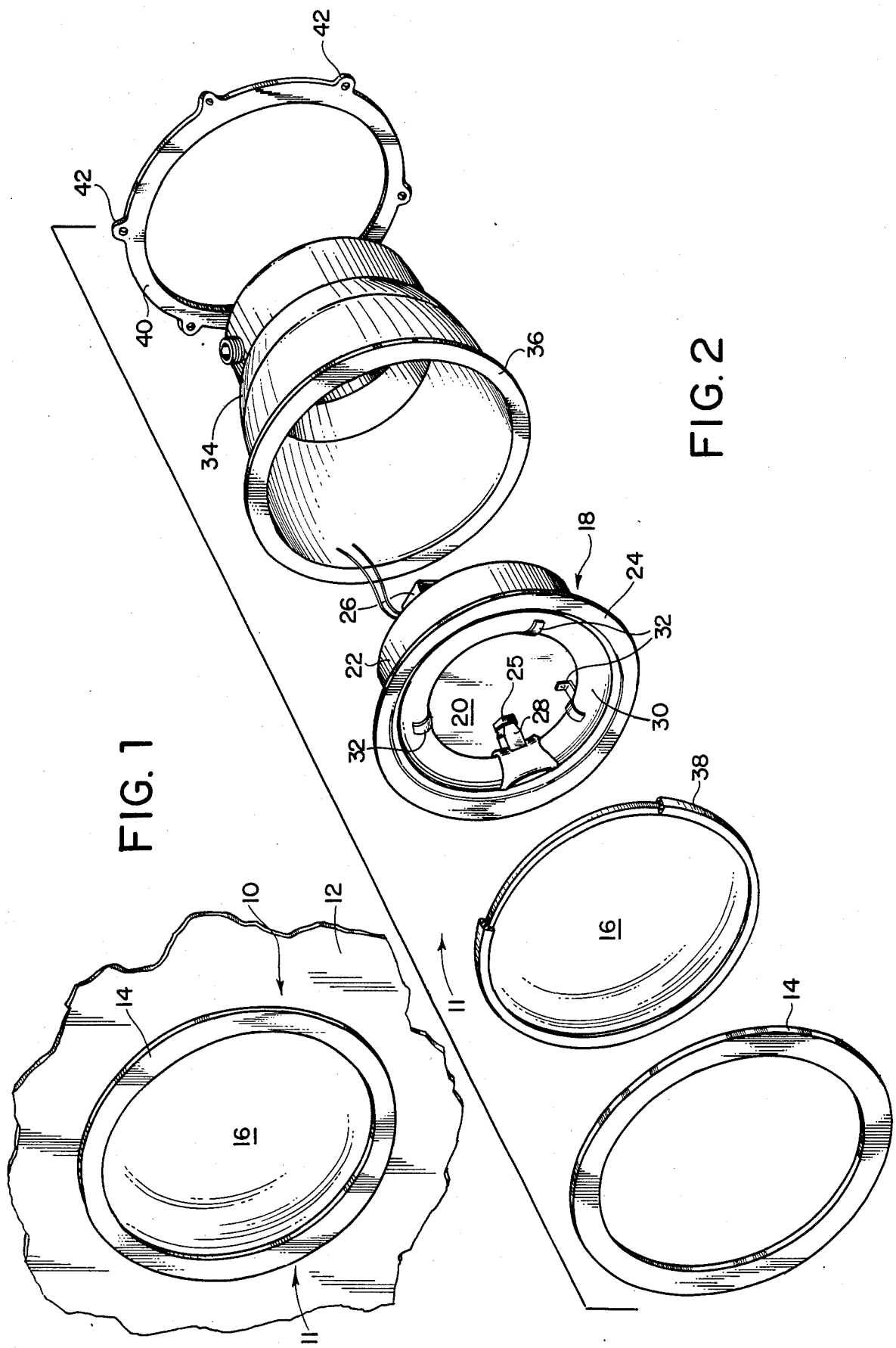

4,617,615

POOL LIGHT

This is a continuation of application Ser. No. 503,613, filed June 13, 1983, now abandoned.

BACKGROUND OF THE INVENTION

The present invention relates generally to pool lights and, more particularly, to a fixture having a flourescent bulb that can be retrofitted into a conventional pool light housing, thereby replacing the incandescent bulb typically utilized in conventional pool lights. The retrofitting can be accomplished with essentially no modification to the conventional pool light housing and housing assembly.

As part of the construction of swimming pools, spas, fountains, another similar water enclosures, it is common to include some form of underwater lighting. The most common method of providing lighting is to permanently provide for the mounting of a light housing in a vertical wall of, for example, a swimming pool, during construction. The lens of the light, which is essentially flush with the wall of the pool, is generally designed to be easily removed in order to change the light bulb, and is provided with a rubber seal between the lens and the housing to assure a watertight seal. The conventional pool light housing is designed to utilize a flood lamp type incandescent bulb typically having a wattage rating of approximately 300 to 400 watts.

Although the prior art pool lights have generally provided the desired underwater lighting result, because of the high wattage incandescent bulb necessary to provide sufficient illumination, their electrical power consumption has been substantial. With the increasing costs of electrical power, the resultant operating costs of such conventional pool lights using high wattage incandescent bulbs has proven prohibitive. Further, the significant heat generated during illumination of the incandescent bulb, which is not readily dissipated in conventional pool light housing, significantly decreases the average life of the incandescent bulb, thereby oftentimes requiring frequent replacement.

SUMMARY OF THE INVENTION

The present invention substantially decreases the electrical power requirement of prior art pool lights by providing a relatively low cost fixture that allows the replacement of the high wattage incandescent bulb with a low wattage fluorescent bulb. The fixture can be retrofitted into conventional incandesent light housings without any modification to the housing, or can be used in a housing specifically designed for the fixture. Since the fluorescent bulb generates little heat, bulb life from heat build-up is substantially increased.

The invention is generally composed of a dish-like light fixture structure that holds a conventional circular fluorescent bulb in its concave portion with the ballast mounted on the reverse side thereof. The fixture includes a flange around its peripheral edge that cooperates with a rubber gasket or seal surrounding the lens of the pool light and upon assembly is disposed between the housing and the lens thereby maintaining the watertight seal. In order to retrofit the fixture into an existing conventional pool light housing, the incandescent bulb and socket is removed from the housing and the fixture of the present invention is placed in the housing and secured in place by replacing the lens and retaining ring assembly. The existing electrical wires are used to furnish electrical power to the fixture.

When the present invention is used in new construction applications, a housing similar to the conventional housing can be employed, but which is substantially more compact and less costly.

Therefore, the present invention comprises a fixture by which a conventional high wattage incandescent pool light can be simply retrofitted with a low wattage fluorescent bulb, thereby substantially reducing the operating costs of pool illumination. Alternatively, a new and substantially smaller housing can be used with the fixture for initial installation in new pool structures.

DESCRIPTION OF THE DRAWINGS

These as well as other advantages of the present invention are best understood through reference to the drawings, in which:

FIG. 1 is a perspective view of a conventional pool lamp housing assembly mounted in the wall of a pool, the lens being essentially flush with the pool wall;

FIG. 2 is an exploded perspective view illustrating the manner in which the fixture of the present invention is retrofitted into the conventional pool lamp housing of FIG. 1;

DETAILED DESCRIPTION OF THE PREFERRED EMBODIMENT

Figure 3:
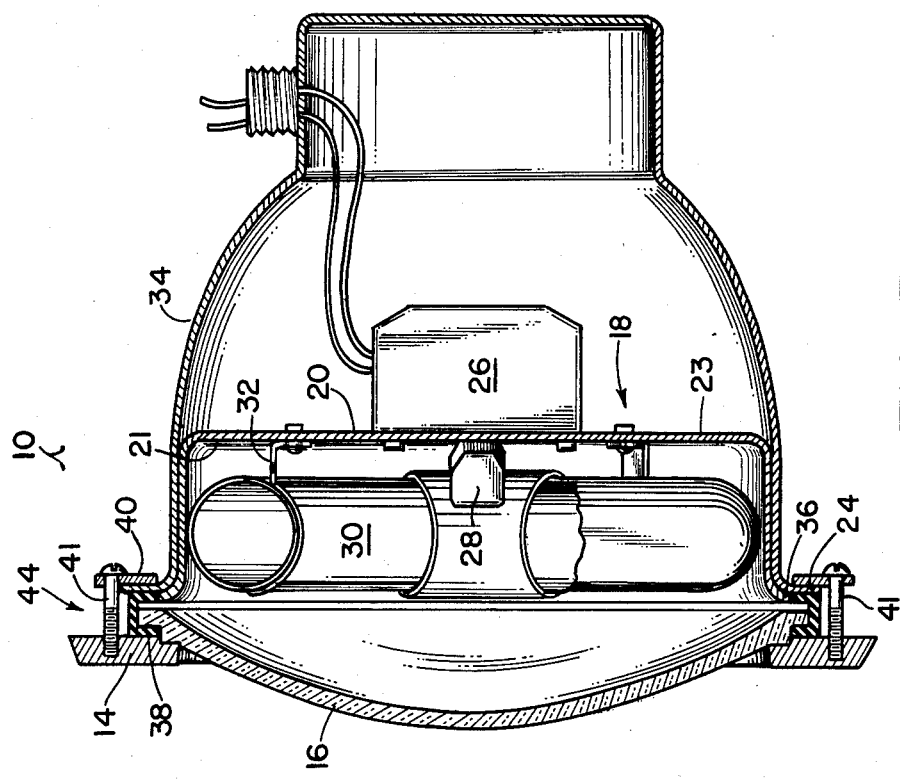
FIG. 3 is a cross-sectional view of the conventional pool lamp housing which has been retrofitted with the present invention.

Referring to FIGS. 1 through 3, the pool lamp 10 of the present invention is shown retrofitted into a conventional pool light housing assembly designated generally by the numeral 11 mounted in a pool wall 12. As is well known, the housing assembly 11 includes an outside retaining ring 14 and convex lens 16 which are generally flush mounted to the vertical plane of the pool wall 12. A compression seal 38 extends about the circumference of the lens 16 and flange lip 36 of a bulb housing 34 to form a watertight seal between the lens 16 and bulb housing 34. The bulb housing 34 is retained within the vertical wall 12 of the pool by a rear mounting ring 40 having plural screw mounts 42 spaced about its circumference. In contrast to the conventional pool light assembly, however, the pool light 10 of the present invention contemplates the removal of the conventional incandescent light bulb and edison socket from the housing assembly 11 and its replacement by a fluorescent light fixture 18.

Referring to FIGS. 2 and 3, the fixture 18 of the present invention is shown in its relative orientation to the other components of the pool light assembly 11. In the preferred embodiment, the fixture 18 is composed of a round dish-shaped structure having a flat back wall 20 and cylindrical side wall 22. The outer edge of the sidewall 22 is formed into a flange 24 disposed at a right angle to the sidewall 22. The fixture 18 is preferably constructed in a one-piece, unitary member and can be fabricated by various fabrication techniques such as spin-forming about a mandrel or stamping. The front surface 21 of the back wall 22 of the fixture 18 is preferably coated with a high illumination pigmented material while the back surface 23 of the wall 22 carries a conventional electrical ballast 26 securely mounted by various means such as pop-rivets. The back wall 20 also includes an aperture 25 through which a standard electrical connector 28 can be extended.

The dish-shaped fixture 18 is designed to receive a conventional circular fluorescent light bulb 30 which is held in place by plural spring clips 32 permanently mounted to the back wall 20. The spring clips 32 are sufficiently flexible to allow easy replacement of the fluorescent bulb 30 within the fixture 18. Due to the front surface 21 of the fixture 18 being coated with a high illumination material, it will be recognized that the surface 21 serves as a relfector for the fluorescent light bulb 30.

As shown in FIGS. 2 and 3, the fixture 18 of the present invention may be retrofitted into the conventional pool light housing assembly 11 from which the incandescent light bulb and edison base socket assembly has been previously removed. In this retrofitted assembly, the fixture 18 is received within the conventional bulb housing 34, with the flange 24 of the fixture 18 facing the flange lip 36 of the bulb housing 34. The maximum diameter of the cylindrical portion of the fixture 18 is only slightly smaller than the inside diameter of the bulb housing 34 so that the fixture 18 and the bulb housing 34 are assembled in a generally coaxial orientation. This assures that the surface of the flange 24 of the fixture 18 and the flange lip 36 of the bulb housing 34 are aligned or facing one another.

As shown in FIG. 2, the lens 16 of the pool lamp 10 cooperates with a U-shaped resilient gasket or seal 38 typically formed of a rubber or elastomeric material. In the conventional prior art assembly 11, this gasket seal 38 extends about the circumference of the lens 16 and is disposed between the flange lip 36 of the bulb housing 34 and the outside retaining ring 14. The rear mounting ring 40 is then used to compress the gasket 38 tightly against the lens 16 and flange lip 36 by inserting screws 41 through the plural screw mounts 42 formed in the rear mounting ring 40 and into the outside retaining ring 14. In the present invention, the flange 24 of the fixture 18 is designed to be sufficiently thin to interpose and extend within the U-shaped gasket seal 38 along with the circumference of lens 16 and directly about the circumference of the lens 16. Further the fixture 18 can be retrofitted into the conventional housing assembly 11 without modifications or additions to the conventional bulb housing 34, lens 16, or seal 38.

The applicant has found that by retrofitting the conventional pool light assembly 11 with the fixture 18 in the manner described, a fluorescent bulb having a power consumption of 20 watts can typically produce suitable illumination in a pool previously requiring a 300 or 500 watt incandescent bulb. In addition, due to the reduced heat generated by the fluorescent bulb 30, bulb life is significantly extended over conventional incandescent pool light systems. Thus, lower operating and maintenance costs are achieved by use of the present invention.

Figure 4:
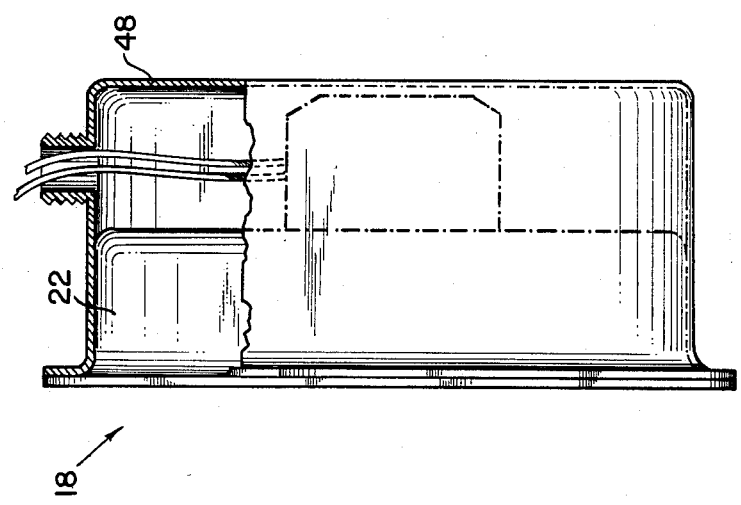
FIG. 4 is a cross-sectional view of the present invention assembled in a novel light housing designed for initial installation in new pool structures.

In addition to the retrofitting benefits of the present invention, the fixture 18 may additionally be utilized in new construction applications. Referring to FIG. 4, the fixture 18 is shown in a housing 48 that has been specifically designed for the fixture 18. Because of the more compact nature of the fixture 18 as compared to the incandescent bulb and socket of the prior art, the housing 48 may be formed to have a substantially reduced axial length which is thereby less costly to produce.

As will be recognized, the same lens 16, seal 38 and remaining components of the assembly 11 may be mounted to the fixture 18 to the pool wall 12.

Those skilled in the art will recognize that although certain materials and part configurations have been defined herein, various modifications can be made thereto and such modifications are clearly contemplated within the spirit of the present invention.

I claim:

1. An improved pool light housing assembly comprising:
    a pool light housing mounted within a pool having a generally cylindrical configuration;
    a fixture having a generally dish-shaped configuration sized to be received within said housing mounted within a pool;
    a fluorescent light bulb disposed within said fixture;
    an electrical ballast mounted to said fixture and adapted to be connected to an electrical power source;
    means for securing said fluorescent light bulb to said fixture;
    a lens sized to extend about said fixture;
    means extending about said lens for sealing said lens to said housing; and
    a flange formed on said fixture adapted to cooperate with said sealing means to seal said fixture to said housing.

2. The pool light of claim 1 wherein said fluorescent light bulb comprises a circular fluorescent light bulb.

3. The pool light of claim 2 wherein said fixture includes an illuminating surface adapted to reflect light emminating from said fluorescent light bulb toward said lens.

4. The pool light of claim 3 wherein said fixture includes a rear wall and said fluorescent light bulb and ballast are mounted on opposite sides of said rear wall.

5. A device for retrofitting a conventional incandescent pool light assembly comprising:
    a fixture formed in a generally cylindrical configuration having a circular fluorescent light bulb and ballast independently mounted on opposite sides of said fixture;
    a circumferential flange sized to cooperate with the existing seal and lens of the conventional pool light assembly to maintain a watertight seal between said lens and fixture; and
    means for removably securing the fluorescent light bulb upon said fixture.

6. A method for retrofitting a conventional pool light assembly having an incandescent bulb comprising the steps of:
    removing the incandescent bulb from the housing of the pool light assembly;
    inserting a generally cylindrical fixture into the housing of the pool light assembly, said fixture having a fluorescent bulb and electrical ballast carried thereon and having a circumferential flange;
    connecting the electrical ballast to an electrical power source;
    placing a lens to extend over said fixture; and
    disposing said flange between said lens and the housing to form a watertight seal between said lens and the housing of the pool light assembly.

* * * * *